(12) United States Patent
Kelman

(10) Patent No.: US 9,392,302 B2
(45) Date of Patent: Jul. 12, 2016

(54) SYSTEM FOR PROVIDING IMPROVED FACILITIES IN TIME-SHIFTED BROADCASTS

(75) Inventor: Alistair Bruce Kelman, London (GB)

(73) Assignee: Cachebox TV Limited, London (GB)

( * ) Notice: Subject to any disclaimer, the term of this patent is extended or adjusted under 35 U.S.C. 154(b) by 0 days.

(21) Appl. No.: 13/990,372

(22) PCT Filed: Nov. 18, 2011

(86) PCT No.: PCT/GB2011/052259
§ 371 (c)(1),
(2), (4) Date: May 29, 2013

(87) PCT Pub. No.: WO2012/072999
PCT Pub. Date: Jun. 7, 2012

(65) Prior Publication Data
US 2013/0318548 A1    Nov. 28, 2013

(30) Foreign Application Priority Data

Dec. 1, 2010 (GB) .................................. 1020361.0

(51) Int. Cl.
| | | |
|---|---|---|
| *H04N 21/234* | (2011.01) | |
| *H04N 21/433* | (2011.01) | |
| *H04N 21/458* | (2011.01) | |
| *H04N 21/475* | (2011.01) | |
| *H04N 5/781* | (2006.01) | |
| *H04N 9/87* | (2006.01) | |

(Continued)

(52) U.S. Cl.
CPC ......... *H04N 21/23424* (2013.01); *H04N 5/781* (2013.01); *H04N 9/87* (2013.01); *H04N 21/4325* (2013.01); *H04N 21/4331* (2013.01); *H04N 21/44016* (2013.01); *H04N 21/458* (2013.01); *H04N 21/4755* (2013.01)

(58) Field of Classification Search
None
See application file for complete search history.

(56) References Cited

U.S. PATENT DOCUMENTS

| | | | |
|---|---|---|---|
| 2002/0015093 A1* | 2/2002 | Dureau et al. ............... | 348/38 |
| 2003/0066078 A1 | 4/2003 | Bjorgan et al. | |
| 2003/0121037 A1 | 6/2003 | Swix et al. | |

(Continued)

FOREIGN PATENT DOCUMENTS

| | | |
|---|---|---|
| EP | 2252055 A1 | 11/2010 |
| GB | 2464630 A | 4/2010 |

(Continued)

OTHER PUBLICATIONS

International Search Report and Written Opinion of PCT/GB2011/052259 mailed on Feb. 13, 2012, 12 pages.

(Continued)

*Primary Examiner* — Nathan Flynn
*Assistant Examiner* — William J Kim
(74) *Attorney, Agent, or Firm* — Kilpatrick Townsend & Stockton LLP

(57) ABSTRACT

In a system for time-shifted viewing of television broadcasts, advertisements 41, 43 are provided with headers 50, 52 containing times of day at which that advert may be viewed or not viewed. A Personal Video Recorder (PVR) 60 stores adverts in an advertisement database 70, stores broadcast program segments in a program database 80, and broadcast rules in a rules database 90. For viewing of the program when time-shifted, the PVR checks the time of day, checks the headers of the adverts, and shows only adverts which are permissibly viewed at that time of day.

16 Claims, 8 Drawing Sheets

(51) Int. Cl.
*H04N 21/432* (2011.01)
*H04N 21/44* (2011.01)

(56) References Cited

U.S. PATENT DOCUMENTS

| | | |
|---|---|---|
| 2004/0158870 A1* | 8/2004 | Paxton et al. ................. 725/115 |
| 2004/0205829 A1* | 10/2004 | Hane, III. ..................... 725/135 |
| 2006/0013556 A1* | 1/2006 | Poslinski ........................ 386/46 |
| 2006/0218617 A1* | 9/2006 | Bradstreet et al. ............ 725/135 |
| 2007/0288951 A1 | 12/2007 | Ray et al. |
| 2008/0307483 A1 | 12/2008 | Iida et al. |
| 2010/0054707 A1 | 3/2010 | Karaoguz et al. |

FOREIGN PATENT DOCUMENTS

| | | |
|---|---|---|
| WO | WO01/82597 A1 | 11/2001 |
| WO | 2004/072761 A2 | 8/2004 |
| WO | WO2007/119125 A1 | 10/2007 |

OTHER PUBLICATIONS

European Search Report completed Jan. 15, 2016 for European Patent Application No. EP15195703 filed Nov. 18, 2011, all pages.

* cited by examiner

SYSTEM FOR PROVIDING IMPROVED FACILITIES IN TIME-SHIFTED BROADCASTS

BACKGROUND TO THE INVENTION

This invention relates to a system for supplying viewers of time-shifted programmes, previously broadcast on television or on radio, with improved facilities during an advertising break, and relates especially to a system which includes the supply of interactive advertisements, and optionally the provision of a loyalty points system.

In many countries there are regulations laid down by the broadcasting authorities which specify the minimum time between advertising breaks in programmes, the maximum length of an advertising break, the maximum number of seconds of advertising which can be broadcast within an hour's viewing. In addition, the time of day at which some adverts may be shown may also be strictly controlled. In the UK for example, if the advertisement is advertising alcoholic drinks containing more than 1.2% alcohol and the advertising regulator responsible is OFCOM then under the Broadcast Committee of Advertising Practice Rules on Scheduling of Television Advertisement the advertisement may not be shown at a time when children under 10 are likely to be viewing—i.e. before 7.30 pm, sometimes referred to as the "watershed". A feature of advertising charging is that certain slots are more valuable than others, eg shortly after 7.30 pm, and premium prices for use of those slots can be charged.

If a programme is recorded and viewed at a different time of day, it contains all of the adverts which were originally broadcast, some of which may be unsuitable for that time. One result is that children may see inappropriate adverts, and another is that advertisers are at present not allowed to charge for the time-shifted viewing of adverts. For example, a recording of a football or cricket game broadcast late at night might contain advertisements for alcohol or gambling or medicines or specific other goods and services which it would be inappropriate to show in the early evening when children might be watching the advertisements. While parental controls in the viewing hardware are able to control and inhibit the showing of sexual or violent programmes to children there are no controls which can remove unsuitable advertisements from time-shifted programmes.

TECHNICAL FIELD

With the arrival of digital television it has been necessary for viewers with existing television sets to purchase a specialist piece of equipment to decode digital and audio broadcasts. This is known as a Set Top Box. It converts the digital broadcast signal into a format which can be displayed on a visual display unit or television set. Set Top Boxes may also contain facilities to decrypt encrypted broadcasts, sometimes by the addition of a smart card authorisation device and facilities which enable them to decode and record digital and audio broadcasts for later viewing. These recording facilities turn Set Top Boxes into Personal Video Recorders (PVRs). In some television sets these facilities may be incorporated into the body of the set.

As shown in FIG. 1, a known PVR 10 contains a computer-type hard disc 12 and twin signal decoders/tuners 14. The PVR 10 is controlled by a remote control 16, such as an Infra Red control, and supplies signals to the viewing station such as a TV set or visual display unit 18. The PVR receives broadcast digital television and audio signals from an aerial 20.

The remote control 16 allows the viewer to navigate through the received digital and audio broadcast channels, to call up an on-screen guide to current and forthcoming programmes, either for live viewing or for recording on the hard disc 12 for later viewing, and to set parental controls. The viewer can pause live TV, schedule the recording of programmes into the hard disc 12, and watch one channel while viewing another by use of the twin decoders 14. The remote control 16 can be used to navigate through a series of menus, sub-menus and sub-sub-menus to select TV and radio content for downloading for live viewing or for storage on the hard disc 12.

The known PVR 10 has what is termed a 'backchannel' supplied by means of either a modem 22 or an Internet connection 24 to enable the viewer to communicate with the broadcaster and others to a limited extent. Via this backchannel the viewer is able at his choice to notify the broadcaster which programmes he is viewing or has viewed and which programmes he is storing for later viewing on his hard disk. Additionally, via the modem 22 or Internet connection 24, the broadcaster is able to send commands to the PVR 10 so that it records specific programmes and/or advertisements using one of the twin decoders 14. Alternatively the broadcaster can "push" programmes and advertisements into the PVR 10 directly from the Internet 24. It is well known that a digital television signal and a backchannel each contain highly accurate time information which can be used by equipment in a PVR 10 to synchronise the start or stop of the recording of programmes. This time information although very accurate, can sometimes need a small offset to take account of transmission and digitisation delays. Once corrected by means of an offset perfect synchronisation between actions required by a broadcaster and actions taken by a PVR can take place FIG. 2 is a schematic diagram of a known format of a television programme supported by advertising breaks. As can be seen the programme is broken up into segments 30, 32, 34 which are separated by advertising breaks, 31, 33 which comply in length and timing with local broadcasting regulations.

The arrival of PVRs in homes has led to two problems. First the conventional advertising model of broadcast television has broken down. Once video (and to a lesser extent audio) signals can be stored for later viewing, the viewer may 'fast forward' through the advertisements. Technological means to inhibit viewers from fast forwarding (by, for example, disabling the fast forward controls when advertisements are being shown) currently meet with viewer dislike.

Secondly, the time-shifting playing of programmes means that the recorded programmes may contain advertisements which are unsuitable for the actual time of viewing.

These two issues are believed to damage the commercial viability of 'free to air' television broadcasting and the enjoyment of the facilities of PVRs by viewers.

It is an object of the invention to provide an improved PVR which improves the viability of 'free to air' television broadcasting while overcoming the viewers' dislike of an inability to fast forward through advertisements. It is a further object of the invention to enable the automatic exclusion of advertisements that should not be shown at the time the programme is being viewed when time-shifted.

BRIEF SUMMARY OF THE INVENTION

According to the invention, a system for providing advertisements during time-shifted viewing/listening comprises:

means to supply broadcast digital video/audio programmes having therein periodic breaks for the insertion of advertisments;

means to supply advertisements within the periodic breaks, each advertisement having associated therewith a header relating to a time of day at which that advertisement may be viewed/not viewed; and means to supply a real time clock signal; arranged so that an advertisement is provided during time-shifted viewing/listening in accordance with its header and the real time of day.

The time of day information in the header may be set in accordance with local broadcasting regulations.

Also according to the invention a Personal Video Recorder (PVR) for use in the inventive system comprising data storage means, input connection means for connection to a source of video/audio signals and a real-time clock signal; and output means for connection to a consumer's viewing/listening unit; in which the data storage means comprises a programme episode database, and an advertisement database arranged to record the advertisements and their headers.

Preferably the header also contains information including the duration and nature of the advert. The nature of the advert may include whether it is passive or interactive or contains the option of loyalty points.

BRIEF DESCRIPTION OF THE DRAWINGS

Reference is made to FIGS. 1 to 8 of the accompanying drawings in which.

DETAILED DESCRIPTION OF THE DRAWINGS

FIG. 3

Figure 1:
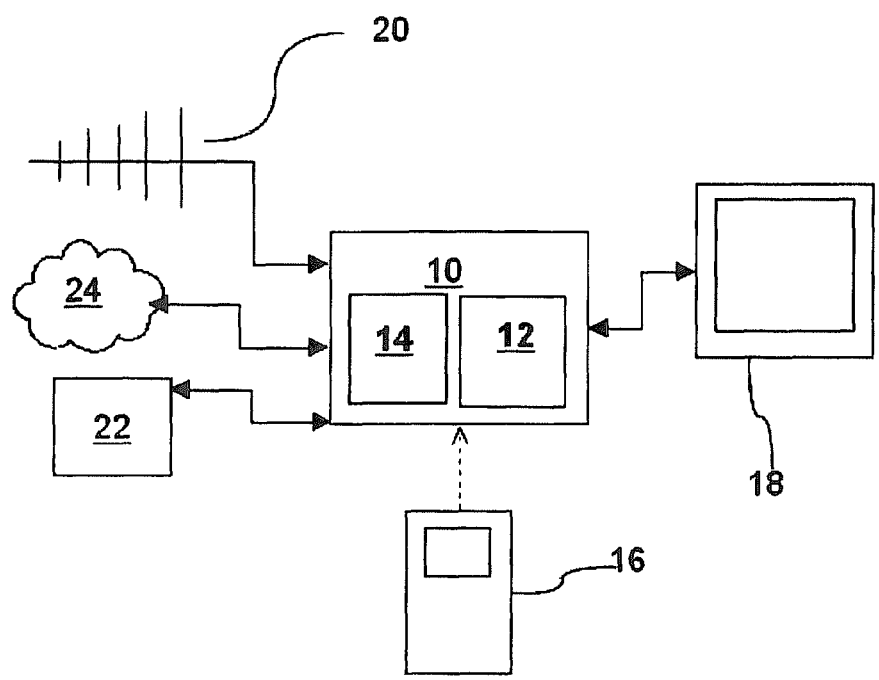
FIG. 1 shows a known personal video recorder (PVR)
Figure 2:
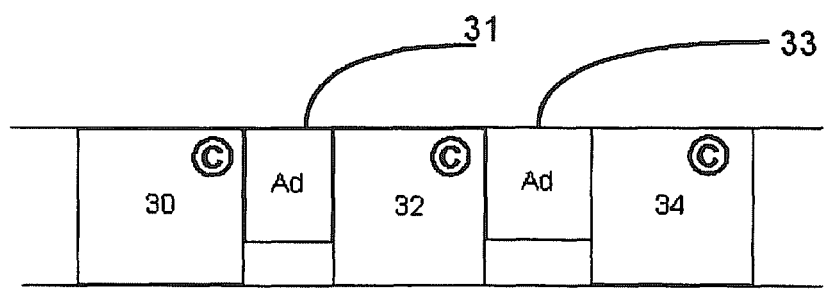
FIG. 2 is a schematic diagram of a known format of a television programme.
Figure 3:
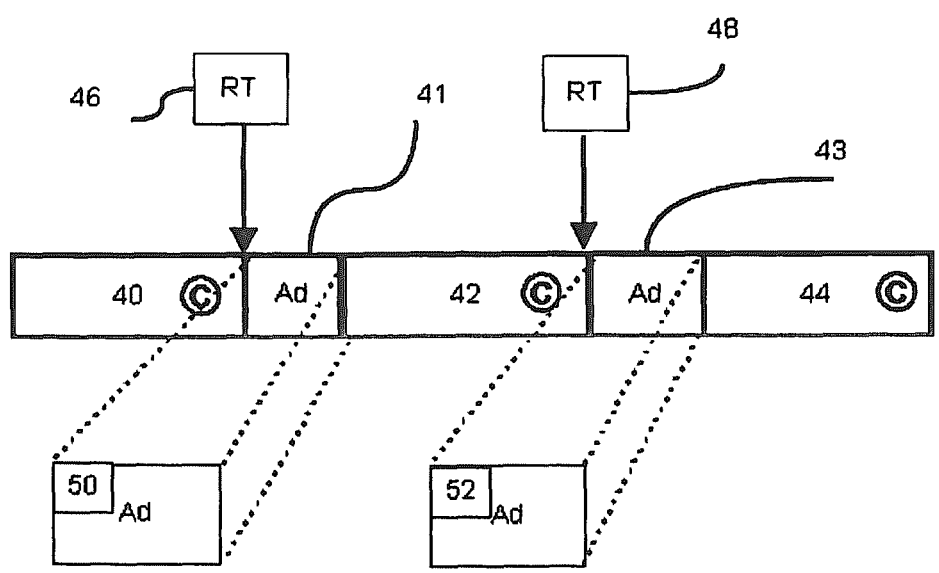
FIG. 3 is a schematic diagram of a television programme supported by advertising breaks and suitable for time-shifted viewing.

In FIG. 3, broadcast programme segments 40, 42, 44 are interleaved with advertisements 41, 43 as in the prior art, and for each segment a Real Time clock signal RT is provided, as shown at 46, 48.

For clarity, only one advertisement is shown in each advertising break between programme segments; in reality there will usually be two or more adverts in each break.

Each advert 41, 43 contains a header 50, 52 which records the duration of the advert, any restriction on the time of day at which it may be viewed, and other information about its nature. The header 50, 52 in each advert contains a series of fields as shown in Table 1:

TABLE 1

Fields in advertisement headers

| Field Name | Activity |
|---|---|
| Time of Day validity | Code to indicate time of day when advert may be shown. |
| Days validity | Code to indicate the days of the week when advert may be shown |
| Advert identifier | Number with check digit to uniquely identify the advert |
| Frame length | Number giving exact length of advert in frames |
| Start date | Earliest date and time of permitted showing |
| End date | Latest date and time of permitted showing |
| Urgency matrix | Table of hours indicating advertiser's preferred time of showing |
| Interactive or Passive | Specifies if a button depression is expected |
| Showings | Number of times advert is to be shown |
| Viewings | Number of times this advert has been shown in time-shifted programme viewing |
| Frequency | Minimum period to elapse before repeat showing |
| When last selected | Date and time when advert last selected for viewing |
| Special expiry | Optional Field |
| Warnings | Keywords to match against viewing regulations |

The Time of Day validity Field may, if required, indicate multiple periods in a day. The Frame Length may work on the standard rate of 25 frames per second. The End Date may be set to coincide with the end of a holiday period. In the Urgency Matrix, there may be an indicator such as a scale of 1 to 15, with a high number indicating peak time viewing; advertisers may wish to select and pay more for peak time showing, The Showings Field is included to prevent too frequent showing with the risk of viewer boredom. The Special Expiry Field is included to indicate that this advert should not be shown during time-shifted viewing. The Warnings Field includes keywords, such as those linked to alcoholic drinks, which can be matched against local viewing regulations.

It is to be understood that many of the Fields are optional, depending on the simplicity or complexity of the desired system for permitting time-shifted viewing of advertisements.

FIG. 4

Figure 4:
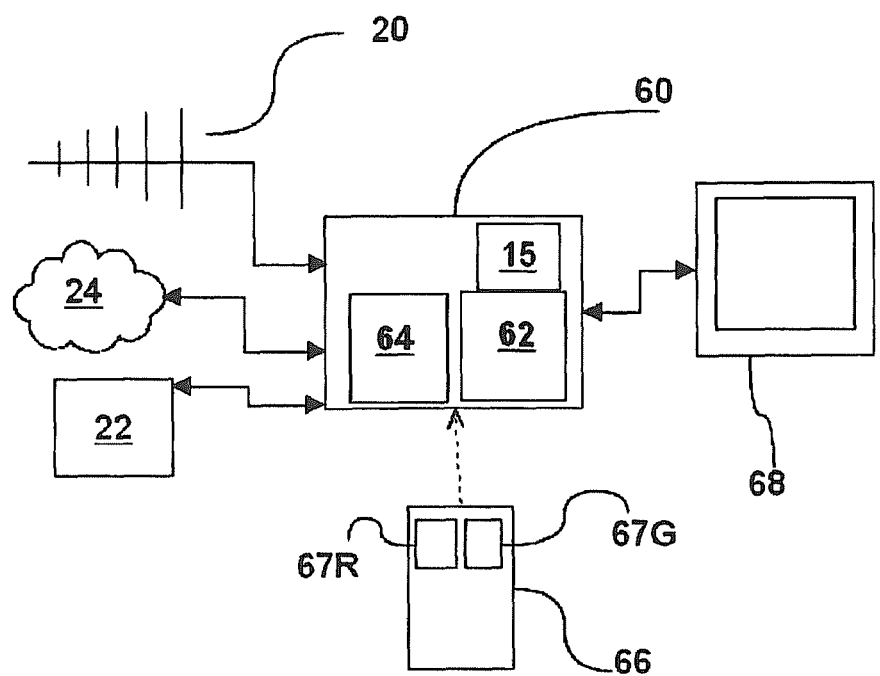
FIG. 4 is a Personal Video Recorder modified for use in the present invention.

Turning now to FIG. 4, in a PVR 60 for use in a system according to the invention, the connections to an aerial 20, a modem 22 and the Internet 24 are as in the prior art. A Real Time of day signal RT is received via the backchannel in either the Internet connection 24 or the connection via the modem 22. This signal is provided in known systems, but in the inventive system the signal is used in a different manner. The viewer's TV set 68 and remote control 66 are also shown, the remote having red and green buttons 67R, 67G as is conventional. The PVR 60 has twin decoders/tuners 64, a hard disc 62 and a memory 15 comprising a plurality of registers.

FIG. 5

Figure 5:
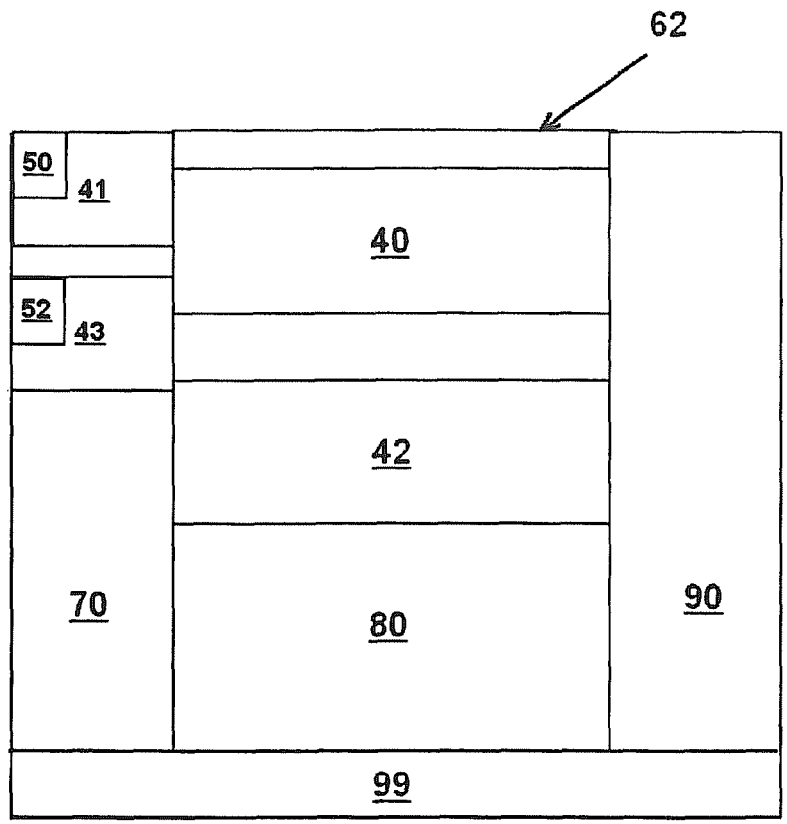
FIG. 5 is a detailed view of the hard disc of the PVR.

FIG. 5 shows in detail the hard disc 62 in the PVR 60 It has three parts, an advertisement database 70 which stores advertisements from the broadcast programme; a programme database 80, which stores the broadcast programme segments; and a rules database 90 which stores the rules which apply to broadcast advertisements. The data in the programme and advertisement databases are encrypted, as indicated at 99.

In the advertisement database 70, each advertisement 41, 43 is stored together with a header 50, 52, the headers being described in Table 1 above. In the programme database 80, each programme is divided into its segments 40, 42. The rules database 90 contains rules to control the showing of advertisements at unsuitable times or on unsuitable days of the week and the like.

FIG. 6

Figure 6:
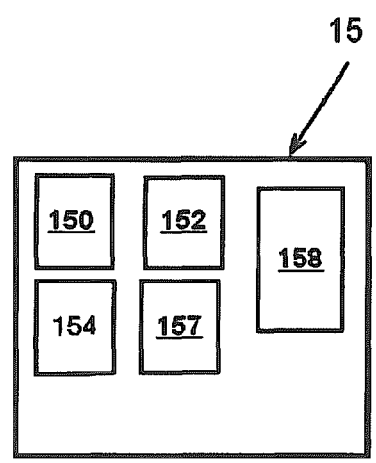
FIG. 6 is a detailed view of the solid state memory of the PVR.

FIG. 6 shows the memory 15 of the PVR 60, in which there are a number of registers, of which five are shown as 150, 152, 154, 156 158. Two registers 150, 152, are each used as a count-down timer; two registers 154, 156, are used as storage locations for loyalty points earned by a viewer and as a millisecond offset adjustment register respectively; and register 158 is used as a buffer memory to hold a series or queue of advertisements ready to be shown to the viewer.

In a simple system, when the owner of the PVR instructs play of a recorded programme, at each advertising break the PVR checks the current Real Time of day RT, checks the Time of Day validity header in each advert for restrictions on time of playing, and if there is no such restriction, shows the originally broadcast advert at a shifted time. Such an arrangement will permit advertisers to charge for the second viewing, which has previously been forbidden by law. If the advert cannot legally be shown at the Real Time of the time-shifted viewing, it is not played and the PVR checks the next stored advert from the broadcast. The duration of the advertising break can, if necessary, be reduced, unlike a broadcast advertising break. In a small variation, the Days validity header can contain a restriction on day of the week, for example an advert which should not be viewed on a Sunday, and the PVR will be arranged to check this also before showing the advert.

However a system according to the invention permits more complex arrangements, including the provision of additional adverts for viewing during a time-shifted programme.

Figure 7:
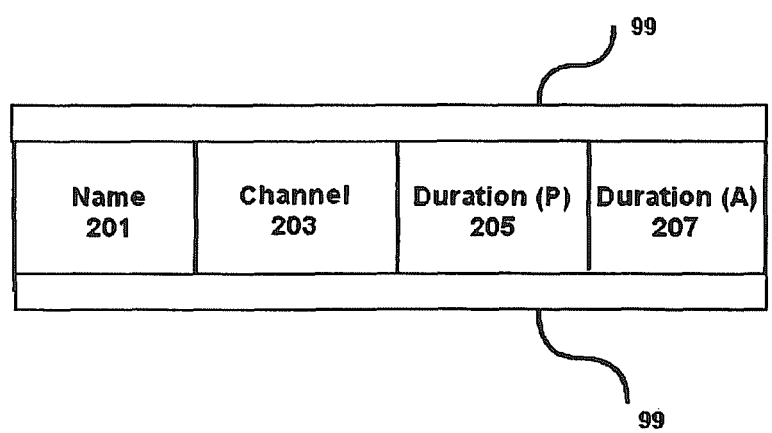
FIG. 7 is a format of a broadcast side channel.

In one arrangement, when the broadcaster broadcasts the programme with its interleaved advertisements, the broadcaster additionally broadcasts a signal in an encrypted side channel which supplies detailed information concerning the programme being broadcast, specifically the length of the segment of the programme currently being broadcast and the length of the next advertising break. The format of this side channel signal is illustrated in FIG. 7 where 201 is the name of the broadcaster, 203 is the broadcast channel, 205 is the duration in milliseconds of the programme segment to the next advertising break and 207 is the duration in milliseconds of the next advertising break. The encryption is indicated at 99. Each receiving PVR receives this information concerning a programme it is about to record or is currently recording.

Before a time-shifted programme is viewed, the broadcaster sends to the PVRs connected to the system a series of adverts and their headers which are recorded by the PVRs in the advertisement database 70 of PVR 60. The series can be sent during the normal broadcasting of programmes, or during a special broadcast at off-peak times, or via the back channel. The adverts may be a mixture of passive adverts when no viewer reaction is requested, and active adverts when a viewer is requested to respond, conveniently by pressing the red and green buttons 67R, 67G on the remote control 66 in FIG. 4. The viewer may be rewarded for responding e.g. by the award of loyalty points convertible into money or money's worth.

With such advertisements, the full range of Fields shown in Table 1 above can improve the use of an advertising budget. For example, the Frequency Field can set the minimum time between showings to the same viewer; the Urgency Matrix can be used to ensure the showing of adverts at a selected time, such as a car advert to be shown at 20.00 hours plus or minus 15 minutes, when this Field ensures that during a time-shifted viewing including this time, the advert is given high priority; and the Showings and Frequency Fields can be set to prevent the same advert being shown too often to the same viewer.

The Fields in an advert header can be used to ensure that only appropriate adverts are shown during the time-shifted viewing, e.g. the Time of Day Validity and Days Validity will prevent certain adverts, such as those for alcoholic drinks, being shown before e.g. 7.30 pm so that children are protected, and that certain adverts are not shown on a Sunday. Even a selected word can be used as a control e.g. the word "politician" can prevent an advert being shown during an election campaign.

Advertising breaks advantageously contain a mix of two types of advertisements: interactive advertisements and passive advertisements. Interactive advertisements are those which request the viewer to respond e.g. by pressing a button on a remote control. Any key depressions received will be recorded by the PVR and sent to the broadcaster. The viewer may be awarded loyalty points for making key depressions in Interactive advertisements, which are convertible into money or money's worth (e.g. pay-per-view programmes) upon redemption by the viewer.

Surrounding the interactive advertisements elsewhere in the advertising break there may be passive advertisements— that is to say advertisements which do not require the viewer to depress a key on his remote control. The viewer receives no loyalty points for watching or listening to a passive advertisement. However the juxtaposition of passive adverts with interactive advertisements improves the chance that passive advertisements are viewed or listened to attentively by the viewer.

FIG. 8

Figure 8:
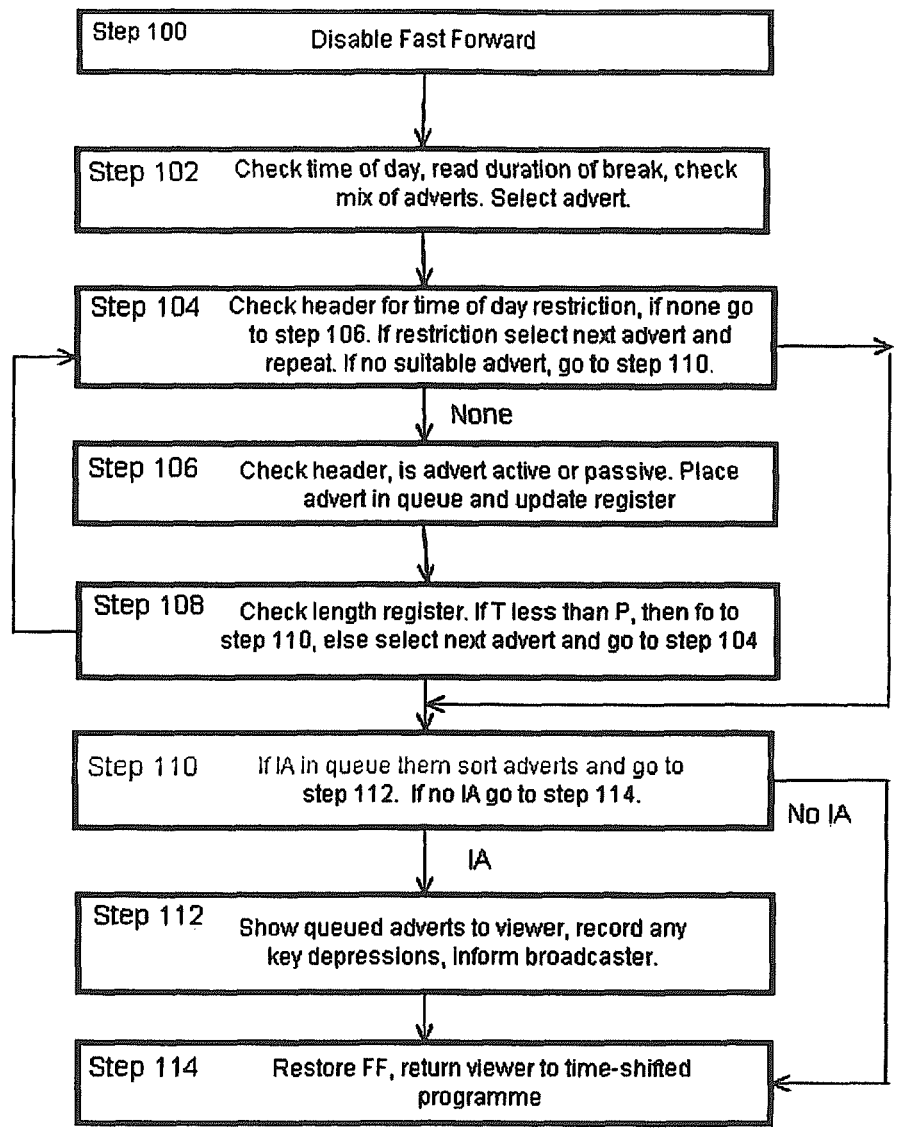
FIG. 8 is a flow chart of steps taken by a PVR during a time-shifted programme viewing.

The flowchart of FIG. 8 shows the steps taken in a PVR to ensure provision of legally acceptable adverts during a time-shifted viewing of a previously broadcast programme, while also providing an advantageous mixture of advertisement types.

In Step 100 the PVR disables the viewer's fast forward facility.

In Step 102 the PVR 60 checks the Real Time of day signal RT and ensures by means of use of the offset register 156 that the PVR 60 is in perfect synchronisation with signals coming from the broadcaster. The PVR then checks the rules database 90 and determines the appropriate duration of the entire advertising break. The PVR then checks in the rules database 90 the prescribed mix of interactive and passive advertisements for an advertising break of this duration, and stores the duration of the advertising break in a length register 150 in the hard disc (see FIG. 6) and stores the total allowable time of interactive adverts in the prescribed break in an interactive register 152. The PVR then selects an advertisement from the store of live and matched advertisements held in its advertisement database 70.

In Step 104 the PVR reads the header information associated with the selected advertisement and checks any time or day of showing restrictions. If there no such restriction then move to Step 106. If there is such a restriction the PVR 60 selects the next advertisement from the advertisement database 70, and continues checking the headers until an advertisement is found of a type which can be shown at the current time of day and move to Step 106. If no suitable advertisements are found go to Step 110

In Step 106 the PVR 60 checks header information indicating if the advert is passive or interactive. If it is an interactive advert its duration is subtracted from the interactive register 152 and if the remaining time is equal to or more than zero, the subtraction is recorded by the register 152, the advert is placed in a queue for viewing in the buffer memory 158 and the PVR moves to Step 108. If the time T left in the interactive register is less than zero the interactive advert is rejected and the PVR 60 selects the next passive advertisement from the store in the advertisement database 70, subtracts its duration P from the length register 150 and moves to Step 108

In Step 108 the PVR checks the length register 150. If the time T left is less than a defined number of seconds, move to Step 110 else select another advert from the database and return to Step 104.

Step 110—If there are any interactive advertisements IA in the advertising break, then the adverts are sorted so that, where possible, the interactive advertisements are interspersed with passive advertisements and move to Step 112. If there are no interactive advertisements IA in the advertising break, move to Step 114.

In Step 112 the PVR 60 shows the stored queued advertisements from the buffer memory 158 to the viewer. During the showing, the PVR records any depressions of the red or green buttons 67R, 67G on the viewer's remote control 66 made during the advertising break and updates the viewer loyalty points register 156. Via the backchannel, the PVR 60 informs the broadcaster which advertisements were shown to the viewer during the advertising break and whether the viewer made any key depressions during the break in response to the interactive advertisements contained in the break.

In Step 114 the PVR 60 restores the fast-forward facility and returns the viewer to the time-shifted programme he was watching prior to the advertising break.

It is also possible to use the system according to the invention to supply advertisements which are matched to previously-provided viewer interests. In such a system, a viewer voluntarily provides personal data, such as post code, income level, hobbies and interests and the like. This permits an advertiser to match an advert to that viewer. For example a viewer with an interest in cars can be sent information on books and videos about cars, or special price offers of an actual car. Such adverts will be referred to as matched adverts, while the previously broadcast advertisements will be referred to as live adverts.

Different numbers of loyalty points can be given at different times of the day—thereby encouraging a viewer to watch a time-shifted programme containing up-to-the-minute advertisements at a specific time of the day to maximise the number of points the viewer receives. By this means viewers can be persuaded to watch a time-shifted programme (and hence advertisements) at a time that they might otherwise not watch that programme.

An advertising break may also contain interactive advertisements which are trailers for other programmes. Depressing the correct button on the remote control while the trailer is being shown will cause the PVR to note that the viewer wishes this programme being trailed to be recorded when it is broadcast so that the viewer can be view it in time-shifted format. While it is not anticipated that loyalty points will normally be awarded for depressing a button on the remote control during a trailer, the proximity of interactive trailers with passive advertisements in the same advertising break is believed to increase the attentiveness with which the passive advertisements are viewed or listened to.

By reason of this method of inserting a combination of interactive and passive advertisements supported by a loyalty points system in a manner which conforms to the advertising regulations which apply for the actual time of viewing, the broadcaster may be able to sell more advertising. The time-shifted viewing becomes a 'shadow channel', and a broadcaster can sell advertising simply on the basis of the time an advertisement is being viewed. Furthermore, if the broadcaster broadcasts a family of channels, the broadcaster's shadow channel would consist of any programme that had been broadcast and recorded on the PVR from any of the broadcaster's channels that was being watched at that precise time.

It is believed that, because most television viewers tend not to make regular extensive searches for new programmes to watch, but tend, when viewing television, first to see what is being broadcast on live television that interests them and then, if there is nothing good to view, seeing what they may have already recorded for time-shifted viewing. The facility extensively to populate a PVR with content from a broadcaster in which advertising slots can be sold based on the time of viewing, could lead to very substantial revenues being generated from a broadcaster's "shadow channel".

The PVR has been illustrated as being separate from a television set, but it may be incorporated into a television set. In a variation the time-shifted programme may be viewed on a visual display unit, for example in a personal computer.

The invention has been described with reference to time-shifted viewing of broadcast television programmes but is also applicable to time-shifted listening to broadcast radio programmes.

The invention claimed is:

1. A system for automating compliance with local broadcasting regulations laid down by a broadcasting authority and applicable to advertisements, said advertisements being provided during time-shifted viewing/listening comprises:
   programme supply means to supply broadcast digital video/audio programmes having therein periodic breaks for the insertion of advertisements;
   advertisement supply means to supply advertisements within the periodic breaks, each advertisement having associated therewith a header comprising a first field related to a local broadcasting time regulation laid down by the broadcasting authority, which local broadcasting time regulation restricts the time of day at which said advertisement may be shown, and a second field related to the number of times said advertisement has previously been shown during time-shifted viewing;
   rules database means containing rules relating to said local broadcasting time regulation;
   clock means to supply a real-time clock signal; and
   control means arranged to read said first field and said clock signal and said rules database and to apply said local broadcasting time regulation to each advertisement before said advertisement is shown;
   wherein the control means is further arranged to update the second field in the header of said advertisement when said advertisement is again shown during time-shifted viewing.

2. The system according to claim 1 in which each header includes a keyword, and the control means checks the keyword against the rules database during application of said local broadcasting time regulation to said advertisement.

3. The system according to claim 2 in which a further local broadcasting regulation forbids the provision of certain types of advertisement on certain days of the week and each header further indicates a day of the week validity.

4. The system according to claim 1 in which the advertisements include interactive advertisements to which a response by a consumer is requested.

5. The system according to claim 4 in which a response by a consumer is rewarded by money or money's worth.

6. The system according to claim 1 in which the broadcast video/audio programme is arranged to contain information including the duration of each segment of programme between periodic breaks and the duration of the next periodic break.

7. The system according to claim 1, wherein the system is a personal video recorder (PVR), and wherein the rules database means is a rules database stored locally in the PVR.

8. The system according to claim 1, wherein the control means is further arranged to, when the application of said local broadcasting time regulation to a particular advertisement indicates that showing the particular advertisement would violate the local broadcasting time regulation, search the advertisements stored in the advertisement supply means until either an advertisement is found that does not violate the local broadcasting time regulation or it is determined that no advertisement stored in the advertisement supply means is suitable for showing under the local broadcasting time regulation.

9. The system according to claim 8, wherein the advertisements stored in the advertisement supply means include advertisements that were broadcast live with a programme being shown during time-shifted viewing and also include advertisements that were received by the system other than in the live broadcast of the programme being shown in time-shifted viewing, and wherein the control means is further arranged to show during time-shifted viewing of the programme a mix of advertisements that were received during the live broadcast of the programme and advertisements that were received other than in the live broadcast of the program1ne being shown during time-shifted viewing.

10. The system according to claim 1, wherein the control means is further arranged to, when the application of said local broadcasting time regulation to a particular advertisement indicates that showing the particular ad\ advertisement would not violate the local broadcasting time regulation;
   determine from the header of the particular advertisement that the advertisement is an interactive advertisement;
   compare the length of the advertisement with a remaining allotted time for showing interactive advertisements;
   determine that the length of the advertisement exceeds the remaining allotted time for showing interactive advertisements; and
   in response to the determination that the length of the advertisement exceeds the remaining allotted time for showing interactive advertisements, reject the advertisement and select a passive advertisement for showing.

11. The system according to claim 1, wherein the control means is further arranged to determine whether each advertisement stored in the advertisement supply means is interactive or passive, and to sort the advertisements to ensure that interactive advertisements are interspersed with passive advertisements as advertisements are shown during time-shifted viewing.

12. A Personal Video Recorder (PVR) for use in a system for automating compliance with local broadcasting regulations laid down by a broadcasting authority and applicable to advertisements, said advertisements being provided during time-shifted viewing/listening, the PVR comprising:
   data storage means storing a programme episode database, an advertisement database, and a rules database, each stored advertisement having associated therewith a header comprising a first field related to a local broadcasting time regulation laid down by the broadcasting authority, which local broadcasting time regulation restricts the time of day at which said advertisement may be shown, and a second field related to the number of times said advertisement has previously been shown during time-shifted viewing, wherein the rules database contains rules relating to said local broadcasting time regulation, and wherein the stored programme episodes have periodic breaks for the insertion of advertisements;
   input connection means for connection to a source of video/audio signals and a real-time clock signal;
   output means for connection to a consumer's viewing/listening unit; and
   control means arranged to read said first field and said clock signal and said rules database and to apply said local broadcasting time regulation to each advertisement before said advertisement is shown during one of the periodic breaks;
   wherein the control means is further arranged to update the second field in the header of said advertisement when said advertisement is again shown during time-shifted viewing.

13. The PVR according to claim 12 arranged to read the real-time clock, to read the first field in the header of an advertisement, to read the rules database, and to provide that advertisement to a consumer's viewing/listening unit only when its header and the rules database do not indicate that the advertisement may not be viewed at the real time of day indicated by the clock signal.

14. The PVR according to claim 13 further arranged to supply to the viewing unit interactive advertisements which request a response from the viewer, and to record such a response.

15. The PVR according to claim 13, further arranged to update the second field in the header when said advertisement is provided to the consumer's viewing/listening unit.

16. A television set incorporating the Personal Video Recorder according to claim 12.

* * * * *